United States Patent
Burt

(10) Patent No.: US 6,353,207 B1
(45) Date of Patent: Mar. 5, 2002

(54) EXPANDABLE CHAMBER HAVING COMBINED OCCUPANT SUPPORT AND HEATING

(75) Inventor: Steven John Burt, Reading (GB)

(73) Assignee: Ctex Seat Comfort Ltd., Burton on Trent (GB)

(*) Notice: Subject to any disclaimer, the term of this patent is extended or adjusted under 35 U.S.C. 154(b) by 0 days.

(21) Appl. No.: 09/640,445

(22) Filed: Aug. 17, 2000

(51) Int. Cl.⁷ .................................................. H05B 1/00
(52) U.S. Cl. .................... 219/217; 701/49; 219/386; 219/527; 219/528; 219/533; 219/549
(58) Field of Search ................. 219/211, 212, 219/217, 385, 386, 527, 528, 529, 533, 535, 549; 392/443; 5/400, 658; 524/495, 496; 137/223; 701/49; 280/727; 297/180.11, 180.12, 180.15, 284.6

(56) References Cited

U.S. PATENT DOCUMENTS

| | | | | |
|---|---|---|---|---|
| 2,032,294 A | * | 2/1936 | McDonald | 219/528 |
| 3,014,117 A | * | 12/1961 | Madding | 219/217 |
| 3,103,219 A | * | 9/1963 | Chadner | 219/528 |
| 3,480,760 A | * | 11/1969 | Young | 219/528 |
| 3,894,213 A | * | 7/1975 | Agarwala | 219/528 |
| 4,044,221 A | * | 8/1977 | Kuhn | 219/217 |
| 4,561,441 A | * | 12/1985 | Kolodziej | 297/180.15 |
| 4,868,898 A | * | 9/1989 | Seto | 219/528 |
| 4,952,776 A | * | 8/1990 | Huguet | 219/217 |
| 5,111,025 A | * | 5/1992 | Barma et al. | 219/217 |
| 5,138,138 A | * | 8/1992 | Theilacker et al. | 219/528 |
| 5,442,156 A | * | 8/1995 | Westerman et al. | 392/443 |
| 5,711,575 A | * | 1/1998 | Hand et al. | 297/284.6 |
| 5,902,011 A | * | 5/1999 | Hand et al. | 297/284.6 |
| 5,928,548 A | * | 7/1999 | Johansson | 219/528 |
| 5,985,976 A | * | 11/1999 | Wartenberg et al. | 524/495 |
| 6,031,212 A | * | 2/2000 | Westerman et al. | 219/535 |
| 6,088,643 A | * | 7/2000 | Long et al. | 701/49 |
| 6,124,578 A | * | 9/2000 | Elliot | 219/528 |

* cited by examiner

Primary Examiner—Teresa Walberg
Assistant Examiner—Fadi H. Dahbour
(74) Attorney, Agent, or Firm—Reising, Ethington, Barnes, Kisselle, Learman & McCulloch, P.C.

(57) ABSTRACT

An expandable chamber support system for vehicle seat and mattress applications includes an expandable chamber constructed from facing sheets of flexible impermeable material that are sealed along their marginal edges. An upper one of the sheets is formed of electrically conductive elastomeric membrane that is electrically resistance heated while cooperating with a lower one of the sheets to provide pressure support for an occupant supported by the expandable chamber.

6 Claims, 2 Drawing Sheets

EXPANDABLE CHAMBER HAVING COMBINED OCCUPANT SUPPORT AND HEATING

This invention relates generally to inflatable air cell systems for occupant support in seating and mattress applications and, more particularly, to the provision of an expandable chamber that includes a wall segment formed of conductive material dispersed in polymeric material and operable to heat seating or mattress applications.

BACKGROUND OF THE INVENTION

Fluid expandable chambers such as expandable chamber or air cells, particularly for pneumatically adjustable occupant support systems in seating or other support applications, are frequently constructed from facing layers of a flexible, air-impermeable material such as thermoplastic urethane, fabric reinforced polyvinylchloride, and other plastic film materials, that are dielectrically sealed or otherwise joined about their marginal edges to enclose an interior inflatable air chamber. A tube connected to such expandable chamber is coupled to a fluid control system for inflation and deflation of the expandable chamber.

Traditionally, such expandable chambers are inflated by either pressurizing or deflating one or more of the cells in accordance with a predetermined control algorithm for providing a desired user support. Alternatively, the pressure can be controlled by a pump and switch under the control of any controller including a timer, a microcomputer or any other form of computer. In such arrangements, the individual expandable chamber or air cell have been located in desired seating configurations including the lumbar region and ischial regions of a user. In such seats a further practice has been to perforate an overlying trim material so that the seat cushion or seat back support surfaces will tend to breath. Leather or a suitable plastic material such as PVC, urethane, polyolefins or the like materials have been provided to give a level of so called breathability.

While suitable for their intended purpose such arrangements neither cool or heat a seat to meet desired uniform thermal comfort considerations. Other seating arrangements are known that will heat or cool a seat. Examples of such arrangements are set-forth in the following listed patents.

| Patent No. | Inventor |
|---|---|
| 4,813,738 | Ito et al. |
| 4,865,379 | Aoki et al. |
| 5,723,845 | Parington et al. |
| 5,921,314 | Schuller et al |
| 5,948,297 | Haubner et al. |
| 5,800,480 | Augustine et al. |

It is also known to provide conductive extrudate articles configured with flat surfaces that will radiate heat when the articles are connected across an electrical source. Examples of such articles are set-forth in U.S. Pat. Nos. 4,954,695 and 5,181,006.

None of the aforesaid arrangements, however, provide for heating a support surface by use of a self heating expandable chamber such as an expandable chamber or air cell.

SUMMARY OF THE INVENTION

The present invention is directed to a fluid support arrangement wherein the fluid inflatable bladder or air cell itself alone provides both thermal conditioning and a containment for a pressure medium for providing desired occupant support. Furthermore, the invention avoids the need for installation of separate heaters within the confines of seating and other types of occupant supports that embody such fluid inflatable bladders or air cells.

The invention for occupant support such as vehicle seating and mattress applications includes an expandable chamber such as an inflatable pressure adjustable air cell or bladder constructed from facing sheets of flexible, air-impermeable cell material sealed along adjoining marginal edges thereon. The facing sheets are comprised of conductive material dispersed as discrete particles embedded in polymeric material to define a self heating sheet that will produce electrical resistance heating of the surface for thermally conditioning the body contacting surface of a vehicle seat or other occupant support application while retaining pressurized fluid within the expandable chamber.

The expandable chamber conforms to an occupant supported thereon and the provision of the self heating sheet therein combines a pressure adjusted shape for support and heating.

A feature of the invention is to provide combined pressure and thermal heating functions in an expandable chamber comprised of two layers of material wherein at least one of the layers is polymeric material having conductive material formed as discrete particles embedded therein that will produce electrical resistance heating for thermally conditioning a body contacting surface of a vehicle seat, furniture seating, mattress or other occupant support application.

A further feature is to provide an expandable chamber such as an inflatable bladder or air cell; the expandable chamber having imperforate walls for containing pressure and a supply tube connected to a fluid system for controlling the pressure in the expandable chamber for providing occupant support and wherein one imperforate wall of the expandable chamber is comprised of a conductive material dispersed in a polymeric material to heat the supported occupant and wherein another imperforate wall of the expandable chamber is formed from electrically insulated, non conductive material and joined to the one imperforate wall to contain pressure within the expandable chamber.

A further feature is to provide such combined pressure support and heating in an expandable chamber including two sealed layers having electrical power leads formed thereon for directing electricity through a top layer formed of electrically conductive carbon loaded polymeric material.

A still further feature is to provide such pressure support and heating in a fluid support system wherein preselected expandable chambers are associated with at least one imperforate support surface formed as a layer of electrically conductive carbon loaded polymeric material that will conform to a supported occupant and when connected across a power source will provide heating.

DRAWINGS

A presently preferred embodiment of the invention is disclosed in the following description, and in the accompanying drawings, wherein.

DETAILED DESCRIPTION

Figure 1:
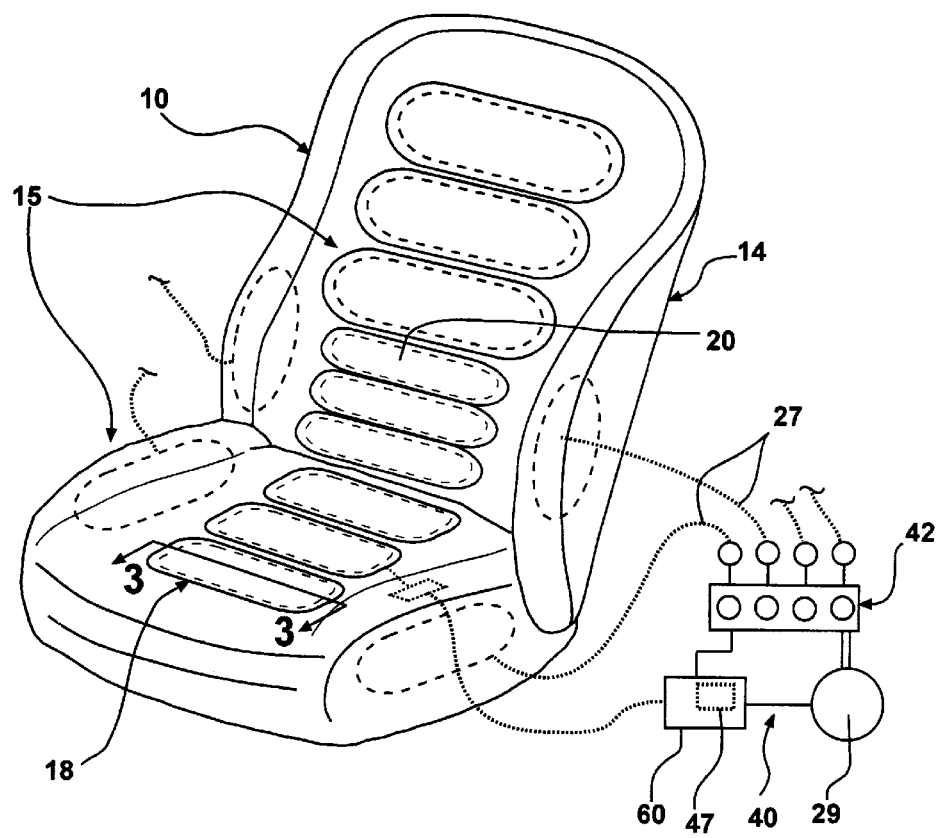
FIG. 1 is a perspective view of a vehicle seat embodying an expandable chamber of the invention.

Referring now more particularly to the drawings, there is shown in FIG. 1 a vehicle seat 10 having a generally horizontal seat rest portion 12 and an upright back rest portion 14 that is coupled to and projects upwardly from the seat rest portion 12 in conventional manner to support an occupant in a seated position on the seat 10.

The seat 10 is provided with an inflatable support system 15 according to the invention which includes one or more expandable chambers such as bladders or inflatable air cells 18 mounted at preselected location within the seat 10, preferably at least on the ischial region wherein fluid inflatable bladder or air cells 18 are shown in FIG. 1 and at the lower back or lumbar region of the backrest 14 wherein the fluid inflatable bladder or air cells 20 are shown. It should be understood that such locations are merely representative and the fluid expandable chambers can be placed in other seating locations such as bolsters, thorax regions and head rest regions (not shown). Furthermore, such expandable chambers or fluid inflatable bladders or air cells can be located on other occupant supports such as mattresses and beds at spaced transversely disposed points thereon or where ever occupant support and heating is desired.

While air cells are often used in such arrangements, the present invention can use fluids other than air to expand the expandable chambers. Such fluids can include liquids such as water and anti-freeze compounds; gases such as nitrogen, air, or other known inflatants.

Figure 2:
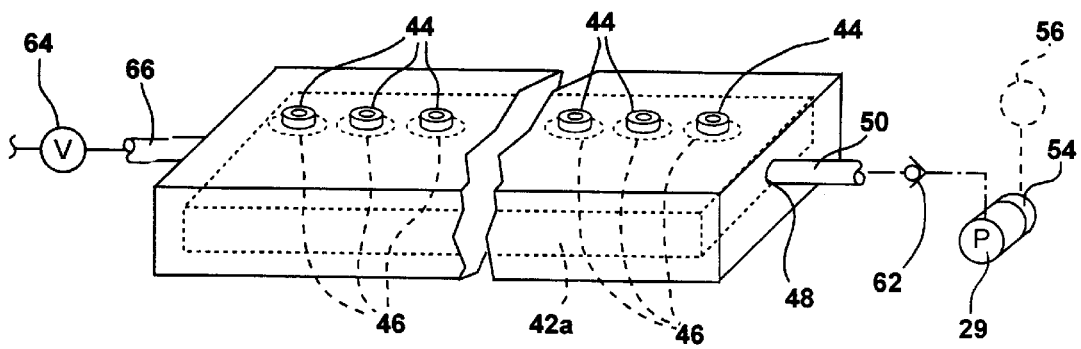
FIG. 2 is a diagrammatic view of a manifold suitable for use with the present invention.

As shown in FIG. 2, on or more of the expandable chambers or air cells 18,20 has two sheets or layers 22, 24 of flexible plastic material, such as plastics, fabrics, or any other of the materials commonly used to construct inflatable fluid inflatable bladder or air cell for connection by tubes 27 to a pump 29. The sheets 22 and 24 are imperforate. Their perimeters 25 are sealed together by a heat weld, ribbon weld, radio frequency welding, adhesives or the like.

The sheets or layers 22, 24 are formed from flexible material, such as plastics, fabrics, or any other of the materials commonly used to construct inflatable fluid inflatable bladder or air cell. Since the sheets 22, 24 are both imperforate and sealed along their perimeters 25, they are configured to form an internal cavity 26.

Figure 3:
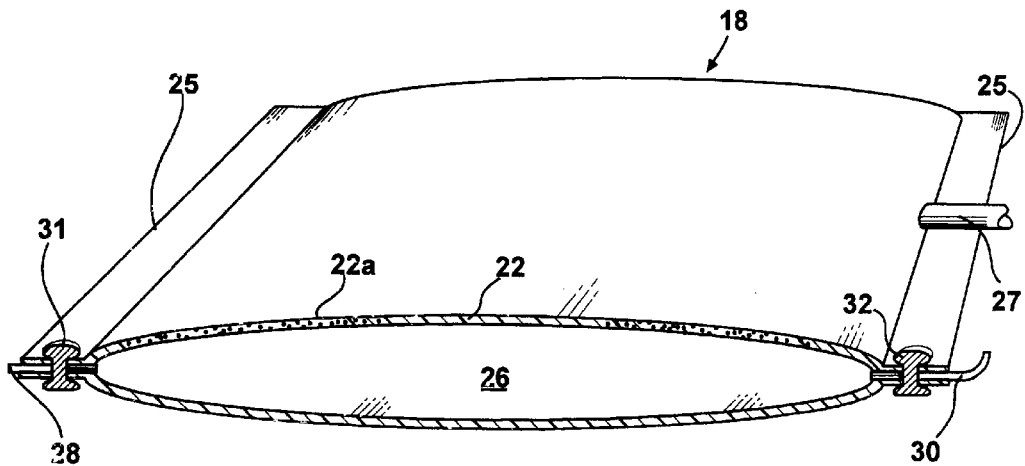
FIG. 3 is an enlarged cross-sectional view taken along the line 3–3 of FIG. 1 looking in the direction of the arrows.

In the embodiment of FIG. 3, the flexible material in the top layer 22 is located below known seat covering material. The top layer is formed from material comprised of electrically conductive materials such as carbon black or metal particles dispersed in polymeric material having a thickness of 0.010 inches to 0.050 inches.

The polymeric material can be polypropylene, polyethylene, thermoplastic olefins and polyvinylchloride. Other materials suitable for mixing with the conductive particles can include materials suitable for waste recycling such as polyurethanes.

Representative formulations and characteristics of such material are set forth in U.S. Pat. Nos. 4,954,695; 5,181,006; and 5,985,976.

The lower layer 24 is formed from a non-conductive material that is an electrical insulator such as a polyolefin material or any other polymeric material that is non-conductive and compatible for joining to the top layer 22. The lower layer has a thickness in the range of 0.010 inches to 0.050 inches.

In the illustrate of embodiment of FIG. 3, electrical leads 28, 30 are connected by rivets 31, 32 at spaced points on the perimeter 25 so that electrical current from a suitably controlled supply 33 can be directed across the top layer 22 for causing the conductive particles therein to produce a resistance heating action for warming the exposed surface 22a of the top layer 22 of the expandable chamber such as fluid inflatable bladder or air cell 18, 20.

In the embodiment of FIGS. 1 and 3 the fluid inflatable bladder or air cell are connected via suitable tubing to a controller 40 for a pneumatic seating comfort adjustment system of the type set-forth in U.S. Pat. No. 6,088,643 commonly assigned and incorporated herein by reference.

The controller has a manifold 41 comprising a housing 42 enclosing a chamber 42a constructed with multiple outlet ports 44 for connecting the chamber 42a to the inlet/outlet tubes of each individual cell or regional group of cells 18, 20. Each outlet port 44 is provided with a control valve 46 for controlling the flow of fluid to and from one or more of the expandable chambers 18, 20. Chamber 42a is also constructed with a single inlet port 48 which is connected to a feed tube 50 to receive pressurized fluid, in this case air, from the pump 29. Pump 29 connects to a pump motor 54 connected to a pump drive 56 that is operated in response to air cell pressure under the control of a microcomputer 60.

A supply valve 62 is provided in feed tube 50 to control the flow of pressurized fluid to the manifold. The manifold can be molded of a high strength plastic or rubber material or other suitable material. The plastic material arrangement can have many of its components integrally molded therein. It is preferred that it be as compact and lightweight as possible. However, the invention can be configured with other than lightweight components and other than with integral components. A common bleed or exhaust valve 64 is provided to selectively release pressure from the manifold chamber 42 a through venting port 66. The pressure in chamber 43 can therefore be adjusted by either actuating pump 52 or bleed valve 64.

While the control valves 46 can be under the control of a suitably programmed microprocessor it will be understood by those skilled in the art that the control valves could constitute one or more manually actuated control valves. Still another arrangement could use the pump, operative alone, as the control of pressure in expandable chambers such as then one more fluid inflatable bladder or air cell 18, 20.

Figure 4:
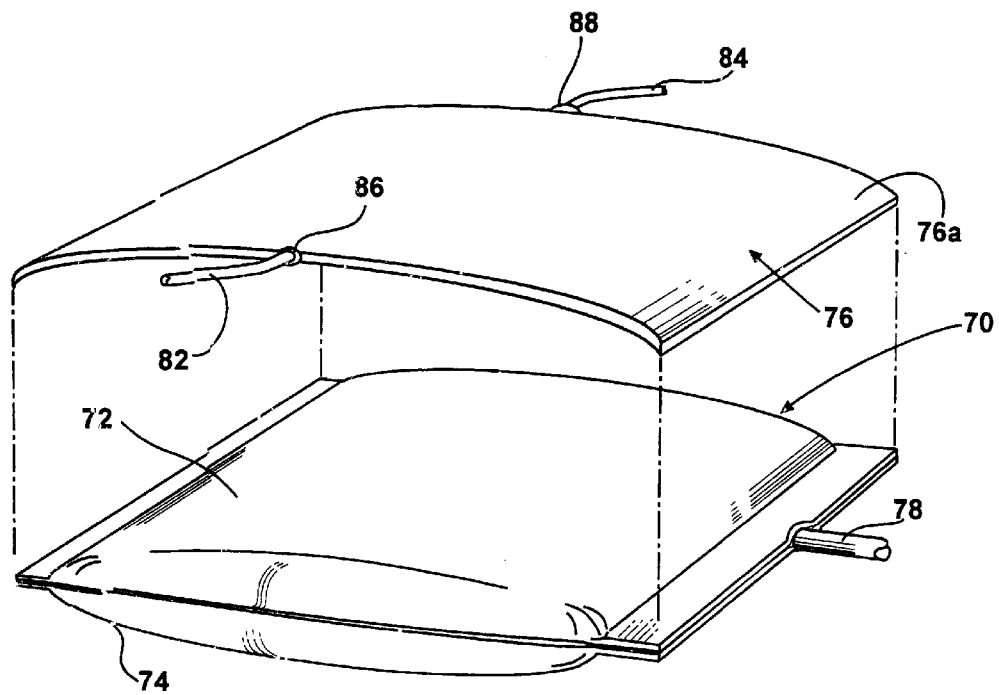
FIG. 4 is a perspective view of another embodiment of the present invention including an electrically heated support layer conformable to an expandable chamber.

In the embodiment of FIG. 4 a fluid pressurized expandable chamber such as a bladder or air cell 70 is shown having spaced sheets 72, 74 of suitable flexible material of the types set-forth below. They form one or more of the air cells of a suitable occupant support such as vehicle seating, furniture seating, mattresses or the like. A third shaped layer 76 is configured to overlie the upper sheet 72. The layer 76 is comprised of electrically conductive particles dispersed in polymeric material having the same properties discussed with respect to the top layer 22 in the embodiment of FIG. 3. In this embodiment the expandable chamber 70 is supplied through a conduit 78 as in the case of the expandable chamber shown in the first embodiment. The expandable chamber 70 is not self heating. Seat or occupant support surface heating, in this embodiment, is provided by connecting the third shaped layer 76 to a source of electrical power through leads 82, 84, respectively connected by suitable fasteners such as rivets 86, 88 to opposite ends of the layer 76. When it is desired to heat an occupant surface the leads are connect by a suitable controller or manual switching arrangement so as to produce electrical resistance heating for warming the upper surface 76a of the layer 76 that is shaped between the occupant and the supporting configuration of the expandable chamber 70.

The disclosed embodiments are representative of a presently preferred form of the invention, but is intended to be illustrative rather than definitive thereof. The invention is defined in the claims.

I claim:

1. A support system for supporting and thermally conditioning an occupant support, the system including:

an expandable chamber comprising multiple distinct layers of flexible material joined to form at least one sealed cavity, one layer of which constitutes an upper layer for supporting an occupant;

an air tube connected to the expandable chamber to provide an opening into the expandable chamber;

a pressure adjusting control system connected to the air tube; and the upper layer being formed of a homogeneous material that is both self heating and fluid impermeable.

2. The support system of claim 1 wherein the upper layer conforms to the occupant support thereon and the upper layer is comprised of electrically conductive material dispersed in polymeric material.

3. In the support system of claim 1 wherein the multiple layers of the expandable chamber consist of two layers of polymeric material joined to form a sealed cavity and wherein one of the two layers is a non conductive electrically insulating material and the other of the two layers is the upper layer.

4. In the support system of claim 1 the upper layer is formed separately of the expandable chamber.

5. In the support system of claim 4 the upper layer operative to produce resistance heating so as to combine support and heating.

6. In the support system of claim 1 the upper layer forming part of the expandable chamber and the upper layer operative to produce resistance heating so as to combine support and heating.

* * * * *

UNITED STATES PATENT AND TRADEMARK OFFICE
CERTIFICATE OF CORRECTION

PATENT NO. : 6,353,207 B1
DATED : March 5, 2002
INVENTOR(S) : Stephen John Burt

It is certified that error appears in the above-identified patent and that said Letters Patent is hereby corrected as shown below:

Title page,
Item [75], delete "Steven" and insert therein -- Stephen --.

Column 3,
Line 15, after "cells 18" insert therein -- , 20 --.
Line 33, after "FIG. 2," delete "on" and insert therein -- one --.

Column 4,
Line 1, after "In the" delete "illustrate" and insert therein -- illustration --.
Line 37, after "Chamber" delete "42" and insert therein -- 42a --.

Signed and Sealed this

Twenty-first Day of January, 2003

JAMES E. ROGAN
*Director of the United States Patent and Trademark Office*